United States Patent
Sarkar et al.

(10) Patent No.: US 7,756,104 B1
(45) Date of Patent: Jul. 13, 2010

(54) METHOD AND APPARATUS FOR USING AN EXTERNAL TRANSCODER IN A COMMUNICATION SESSION

(75) Inventors: Shantanu Sarkar, San Jose, CA (US); Johnny C Chan, San Francisco, CA (US); Wilfred F Wong, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 2511 days.

(21) Appl. No.: 09/735,739

(22) Filed: Dec. 12, 2000

(51) Int. Cl.
*H04L 12/66* (2006.01)

(52) U.S. Cl. .................. 370/352; 370/395.2; 370/401; 370/465

(58) Field of Classification Search .............. 370/236, 370/252, 356, 389, 392, 401, 402, 465, 467, 370/469
See application file for complete search history.

(56) References Cited

U.S. PATENT DOCUMENTS

| | | | |
|---|---|---|---|
| 6,061,566 A * | 5/2000 | Friman | 455/445 |
| 6,304,574 B1 * | 10/2001 | Schoo et al. | 370/401 |
| 6,304,904 B1 * | 10/2001 | Sathyanarayan et al. | 709/224 |
| 6,678,527 B1 * | 1/2004 | Rasanen | 455/450 |
| 6,687,241 B1 * | 2/2004 | Goss | 370/352 |
| 6,731,625 B1 * | 5/2004 | Eastep et al. | 370/352 |
| 6,785,223 B1 * | 8/2004 | Korpi et al. | 370/218 |
| 6,965,947 B1 * | 11/2005 | Hild et al. | 709/246 |

OTHER PUBLICATIONS

"Call transfer supplementary service of H.323," ITU-T Recommendation H.450-2, *International Telecommunication Union*, Feb. 1998, 50 pages.
"Packet-based multimedia communications systems," ITU-T Recommendation H.323, *International Telecommunication Union*, Feb. 1998, 124 pages.

\* cited by examiner

*Primary Examiner*—Chi H. Pham
*Assistant Examiner*—Shick Hom
(74) *Attorney, Agent, or Firm*—Baker Botts L.L.P.

(57) ABSTRACT

A system includes the ability to establish a communication session between stations using protocol capabilities of an external transcoder. The stations may establish a communication session by exchanging protocol capabilities which include a protocol capability of at least one remotely located transcoder. The communication session may then be established using appropriate signalling protocol, including peer-to-peer signalling protocols.

35 Claims, 4 Drawing Sheets

| ADDRESS | PRIORITY | CODEC CAPABILITIES |
|---|---|---|
| – | 1 | G.723 |
| transcode@cisco | 2 | G.723,G.729 |
| 10.1.1.122 | 3 | G.723,G.726 |
| 10.1.1.121 | 4 | G.723,G.726,G.729 |
| resource.net | 2 | GSM EFR |
| ⋮ | ⋮ | ⋮ |
| 52.12.13.97 | 2 | G.723,G.726 |

| SESSION ID | ENDPOINT ADDRESS | CODEC |
|---|---|---|
| 17 | 12.1.1.137 | G.723 |
| 19 | 5.2.3.80 | G.723 |
| 19 | 5.2.3.81 | G.729 |
| 22 | mike@cisco | G.726 |
| 12 | ssarkar@cisco | GSM EFR |
| 12 | 12.1.1.193 | G.723 |
| 12 | 8.12.37.126 | G.726 |

METHOD AND APPARATUS FOR USING AN EXTERNAL TRANSCODER IN A COMMUNICATION SESSION

TECHNICAL FIELD OF THE INVENTION

This invention relates generally to the field of communication, and more particularly to a method and apparatus for using an external transcoder in a communication session.

BACKGROUND OF THE INVENTION

Traditional circuit-switched communication networks have provided a variety of voice services to end users for many years. A recent trend delivers these voice services using networks that communicate voice information in packets. A communication session in a packet network typically includes two stations that together exchange packets of voice information using a protocol supported by both stations.

Current devices may support a number of protocols to communicate voice information in packets. For example, different protocols involve various techniques for compression of voice information. Examples of such voice compression protocols include G.723 and G.729. With the increasing number and complexity of these protocols, stations supporting different protocols may not be able to establish a communication session.

SUMMARY OF THE INVENTION

The present invention solves many of the problems and disadvantages associated with prior communication systems. In a particular embodiment, the present invention provides a method and apparatus for establishing a call between stations using a transcoder.

In a particular embodiment, a method for establishing a call with a station using a transcoder communicates protocol capabilities to a station in response to initiation of a call, wherein the protocol capabilities include a protocol capability of at least one remotely located transcoder. The method initiates transfer of the call to the transcoder to establish a first link between the station and the transcoder, and initiates establishment of a second link with the transcoder to enable media exchange with the station using the protocol capability of the transcoder.

In another embodiment, a communication device includes an interface that communicates with the network and a memory that stores a protocol capability of at least one remotely located transcoder. A processor coupled to the interface and the memory generates a first signal to communicate the protocol capability of the transcoder to a station in response to initiation of a call. The processor generates a second signal to initiate transfer of the call to the transcoder, and third signal to initiate communication with the transcoder to enable media exchange with the station using the protocol capability of the transcoder.

In yet another embodiment, a method for establishing a communication session between a first station and a second station establishes a session identifier associated with the communication session. The method establishes a first link between the first station and the transcoder using the session identifier, and establishes a second link between the second station and the transcoder using the session identifier. The method then exchanges media between the first station and the second station.

Technical advantages of certain embodiments of the present invention include the ability to establish a communication session between stations using protocol capabilities of an external transcoder. In a particular embodiment, the stations establish a communication session by exchanging protocol capabilities, which may include a protocol capability of at least one remotely located transcoder. In this manner, stations with no common communication protocol may still in engage in a communication session by using protocol capabilities of the external transcoder.

Other technical advantages of certain embodiments of the present invention include establishing a communication session that includes protocol capabilities of an external transcoder using peer-to-peer signalling protocol. For example, using H.323 compliant signalling, stations can share both internal and external protocol capabilities to establish a communication session. If the protocol capability is provided by an external transcoder, the stations can establish links to the transcoder in response to call initiation. The transcoder may then identify the established links from each of the stations as part of a communication session and exchange media between the stations using the external protocol capabilities. Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
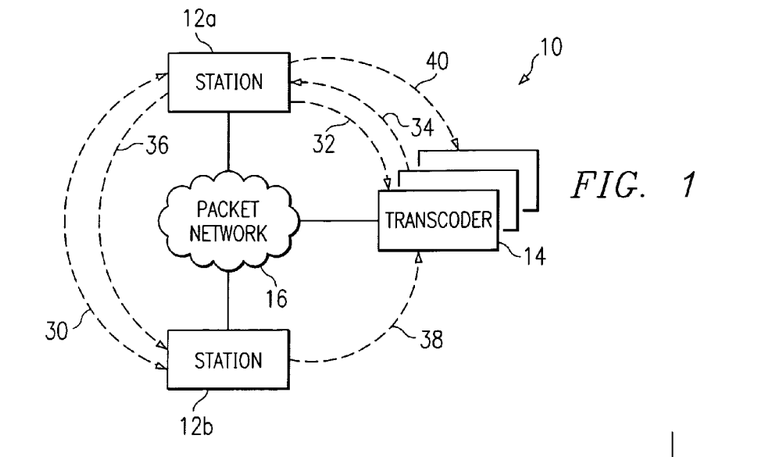
FIG. 1 illustrates one embodiment of a communication system incorporating teachings of the present invention.

FIG. 1 illustrates communication system 10 that includes stations 12a and 12b (generally referred to as stations 12), transcoders 14, and a packet network 16. A communication session established between stations 12a and 12b may use external protocol capabilities provided by transcoders 14.

Stations 12a and 12b may be any combination of hardware and/or software that provide communication services to a user. For example, station 12 may be a telephone, a computer running telephony software, a video monitor, a camera, or any other communication or processing hardware and/or software that supports the communication of packets of voice, video, data, and other information (generally referred to as media) using packet network 16. Stations may include unattended or automated systems, such as interactive voice response units, automated attendants, surveillance cameras, and other similar technologies that can participate in communication sessions. Although two stations 12 are illustrated in FIG. 1, communication system 10 contemplates any number and arrangement of stations for communicating media. For example, the described technologies and techniques for establishing a communication session between stations 12 may be adapted to establish a conference between more than two stations 12.

Each station 12, depending on its configuration, processing capabilities, and other factors, supports certain communication protocols. For example, station 12a may support the G.729 protocol to communicate voice information, whereas station 12b may only support the G.723 protocol. Compression techniques such as G.723 and G.729, as well as other communication protocols for transforming media into packets for communication over packet network 16 may be referred to generally as protocol capabilities of stations 12. Often the protocol capabilities of stations 12 alone do not allow the establishment of a communication session. For the example discussed above, if station 12a only supports the G.729 protocol and station 12b only supports the G.723 protocol, then there is not a common protocol capability that allows stations 12a and 12b to engage in a communication session.

Transcoders 14 remotely located from stations 12a and 12b may provide additional protocol capabilities that allow stations 12a and 12b to engage in a communication session. For example, transcoder 14 may support both the G.723 and G.729 protocols and, therefore, can transcode between these protocols allowing stations 12a and 12b to exchange media. Transcoder 14 may then provide external protocol capabilities to stations 12 in communication system 10. This may be accomplished even if the establishment of a communication session between stations 12a and 12b uses a peer-to-peer signalling protocol, such as H.323.

Packet network 16 may be a local area network (LAN), wide area network (WAN), global distributed network such as the Internet, or any other form of wireless or wireline communication network. Generally, packet network 16 provides for the communication of packets between and among stations 12 and transcoders 14. Packet network 16 may include any combination of routers, hubs, switches, and other hardware and/or software implementing any number of communication protocols that allow for the exchange of packets in communication system 10. In a particular embodiment, packet network 16 employs communication protocols that allow for the addressing or identification of stations 12 and transcoders 14 coupled to packet network 16. For example, using Internet protocol (IP), each of the components coupled together by packet network 16 in communication system 10 may be identified and information directed using IP addresses. In this manner, packet network 16 may support any form and combination of point-to-point, multicast, unicast, or other techniques for exchanging packets among components in communication system 10.

In operation, communication system 10 allows stations 12a and 12b to establish a communication session using external protocol capabilities of transcoder 14. Assume again for this example that station 12a supports only the G.729 protocol to communicate voice information, whereas station 12b supports only the G.723 protocol. Transcoder 14 supports both the G.723 and G.729 protocols. Also, assume for this example that stations 12a and 12b typically establish communication sessions using a peer-to-peer signalling protocol, such as H.323, H.248, or other suitable standard or proprietary peer-to-peer signalling protocols.

Upon initiating a communication session by either stations 12a or 12b, stations 12a and 12b exchange protocol capabilities, as indicated by arrow 30. Protocol capabilities shared by one or both stations 12 may include both internal protocol capabilities supported locally by station 12 as well as external protocol capabilities provided by transcoder 14 remotely located from stations 12. If stations 12a and 12b can establish a communication session using internal protocol capabilities, then the signalling and media exchange proceeds without the use of transcoder 14.

However, if stations 12a and 12b exchange protocol capabilities and rely on an external protocol capability provided by transcoder 14, then communication system 10 supports establishment of the communication session using transcoder 14. To accomplish this, one of stations 12, for this example, station 12a, initiates a transfer to transcoder 14 at arrow 32. Transcoder 14 establishes a session identifier and passes this identifier back to station 12a at arrow 34. In a particular embodiment, consult transfer as opposed to a blind transfer allows transcoder 14 to provide a session identifier to station 12a which may be used by transcoder 14 to bridge the two links from stations 12a and 12b. Station 12a then communicates a transfer notification to station 12b which contains the session identifier as well as the address of transcoder 14 at arrow 36. Station 12b then transfers the call using the address of transcoder 14 and the session identifier, as shown at arrow 38. This establishes a communication link between station 12b and transcoder 14.

To establish a second communication link between station 12a and transcoder 14, station 12a communicates a call setup message to transcoder 14 using the previously established session identifier, as shown at arrow 40. In a particular embodiment, the session identifier may be placed in the facility field supported by an H.323 call setup message. Transcoder 14 associates this second link between station 12a and transcoder 14 with the previously established link between station 12b and transcoder 14, and establishes a communication session. Transcoder 14 then exchanges media using appropriate protocol capabilities to allow stations 12a and 12b to communicate.

Figure 2:
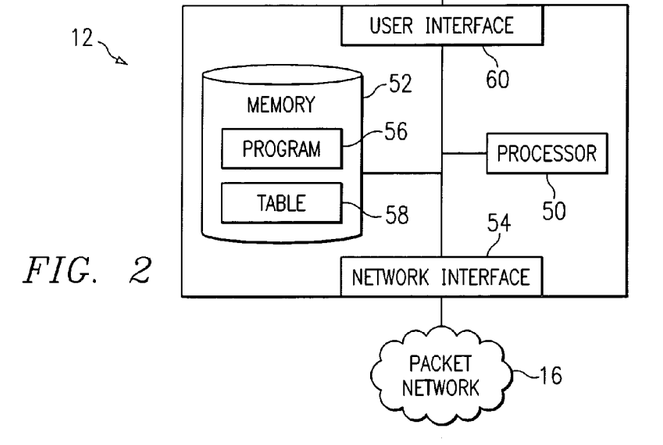
FIG. 2 illustrates a station in the communication system.

FIG. 2 illustrates station 12 in communication system 10. Station 12 includes a processor 50, a memory 52, and a network interface 54. Processor 50 may be a microprocessor, controller, digital signal processor (DSP), or any other suitable computing device or resource. Memory 52 may be any form of volatile or nonvolatile memory, including by not limited to magnetic media, optical media, random access memory (RAM), read only memory (ROM), removable media, or any other suitable local or remote memory component. Memory 52 maintains program 56 and a capabilities table 58. Program 56 may be accessed by processor 50 to manage the overall operation and function of station 12. Table 58 includes both internal and external protocol capabilities available to station 12.

Network interface 54 couples station 12 with packet network 16 to establish communication sessions, provision station 12, update program 56 and/or table 58, or perform other suitable tasks. User interface 60 includes or allows coupling to any number and arrangement of input devices, such as microphones, keypads, pointing devices, and other suitable input devices, as well as any suitable output devices, such as speakers, displays, light indicators, or other appropriate output devices. A user may interact with interface 60 to conduct a communication session that exchanges media with another station. In addition or alternatively, interface 60 may allow local configuration of station 12 using an external interface, graphical user interface, or other configuration technique.

In operation of station 12, processor 50 executes program 56 stored in memory 52 to control the overall management and function of station 12. Upon initiating or receiving a request to establish a communication session, processor 50 accesses protocol capabilities stored in table 58 and provides this information to the other station using interface 54 and packet network 16. If stations 12 select an external protocol capability in table 58 for the communication session, processor 50 issues commands using, for example, a peer-to-peer signalling protocol to establish the communication session using transcoder 14.

Figure 3:
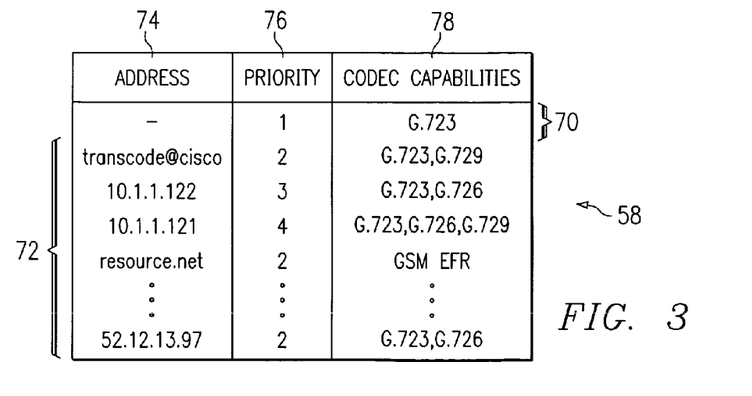
FIG. 3 is a table maintained by the station to specify both internal and external protocol capabilities.

FIG. 3 illustrates a particular embodiment of table 58 maintained by station 12 in memory 52. Table 58 includes both internal resources 70 and external resources 72. Resources may be any device, component, or resource in hardware and/or software that provides protocol capabilities. Transcoder 14 may itself be a resource or contain multiple resources available for establishing communication sessions with stations 12. Each resource 70 and 72 may be specified by address 74, priority 76, and protocol capabilities 78. Since resources 70 represent internal capabilities of station 12, address 74 may be blank or null. Address 74 may be an IP address, SIP address, or any other suitable address or identifier supported by packet network 16. Priority 76 contemplates any ordering or sequencing of resources 70 and 72 used by station 12. For example, resource 70 representing internal protocol capabilities has a priority 76 equal to "1" indicating that station 12 should utilize this resource first. If the priority "1" resource will not support a communication session, station 12 then proceeds to the next resource 72 having priority 76 equal to "2". In a particular embodiment, each of the priority "2" resources that include appropriate protocol capabilities 78 are polled by station 12 to determine availability. If none of the priority "2" resources are available or do not have appropriate protocol capabilities 78 to support the communication session, station 12 proceeds to the resources having a priority 76 equal to "3". This sequence of matching priorities 76 and protocol capabilities 78 of resources 70 and 72 proceeds until station 12 finds a resource of an appropriate transcoder 14 to support the communication session.

Figure 4:
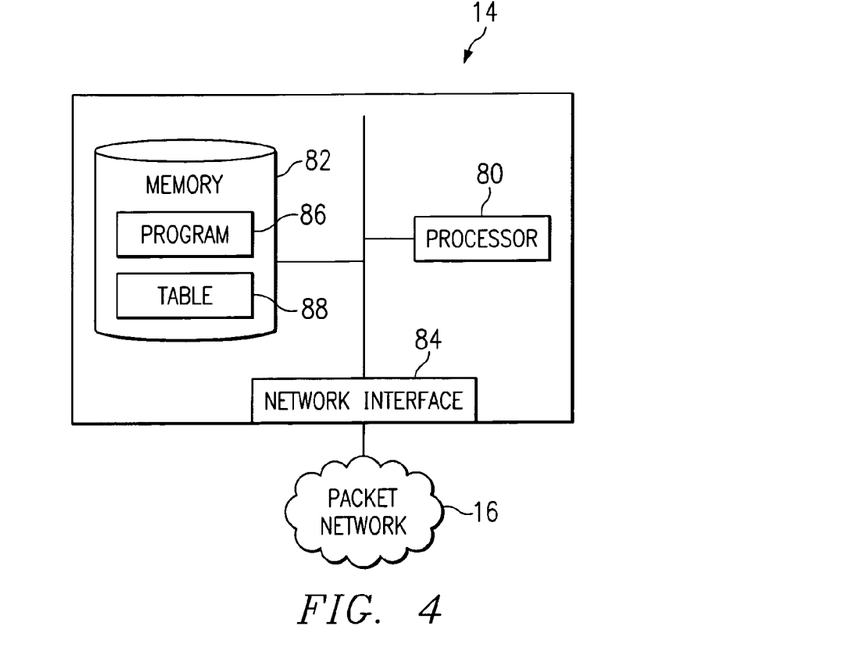
FIG. 4 illustrates a transcoder in the communication system.

FIG. 4 illustrates transcoder 14 in communication system 10. Transcoder 14 includes a processor 80, a memory 82, and a network interface 84. Processor 80 may be a microprocessor, controller, digital signal processor (DSP), or any other suitable computing device or resource. Memory 82 may be any form of volatile or nonvolatile memory, including by not limited to magnetic media, optical media, random access memory (RAM), read only memory (ROM), removable media, or any other suitable local or remote memory component. Memory 82 maintains program 86, which may be accessed by processor 80 to manage the overall operation and function of transcoder 14. Table 88 includes information relating to communication sessions established using transcoder 14.

In operation of transcoder 14, processor 80 executes program 86 stored in memory 82 to control the overall function and management of transcoder 14. In a particular embodiment, processor 80 receives requests to establish links to stations 12 using interface 84. For example, transcoder 14 may receive a call transfer, call setup, or other appropriate signalling to establish communication links with stations 12. Upon receiving these requests, processor 80 determines a session identifier included in the requests or generated as a result of the request to associate two links to establish a communication session. Processor 80 then populates table 88 with appropriate session information. Upon establishing a session, processor 80 performs the various supported protocols to transcode media between stations 12 in communication system 10.

Figure 5:
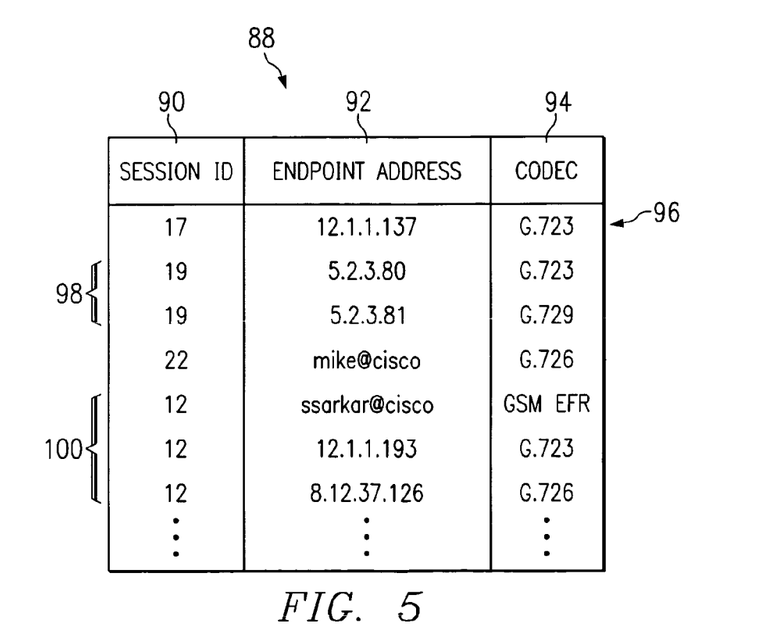
FIG. 5 is a table maintained by the transcoder to specify communication sessions between stations.

FIG. 5 illustrates table 88 maintained in memory of transcoder 14 that includes a number of entries representing communication links established with stations 12. Each entry includes a session identifier 90, a station address or identifier 92, and a codec or communication protocol 94 used to communicate information with station 12. Some of the entries, such as entry 96, is the only entry with a particular session identifier 90, representing one of two links needed to establish a communication session. Therefore, in this particular case, transcoder 14 may be expecting a request from another station 12 that establishes a second link having a session identifier 90 equal to "17".

Other portions of table 88 include two or more entries that share a common session identifier 90. For example, a communication session 98 is represented by two entries sharing session identifier 90 equal to "19". In this embodiment, transcoder 14 currently services a communication session with one station 12 having an address of "5.2.3.80" and supporting the G.723 protocol with another station 12 having an address of "5.2.3.81" and supporting the G.729 protocol. Session 100 includes three entries representing communication links to three stations 12, each entry sharing a common session identifier 90 equal to "12". Transcoder 14 contemplates any number of entries having the same session identifier to establish communication sessions between two or more stations 12.

Figure 6:
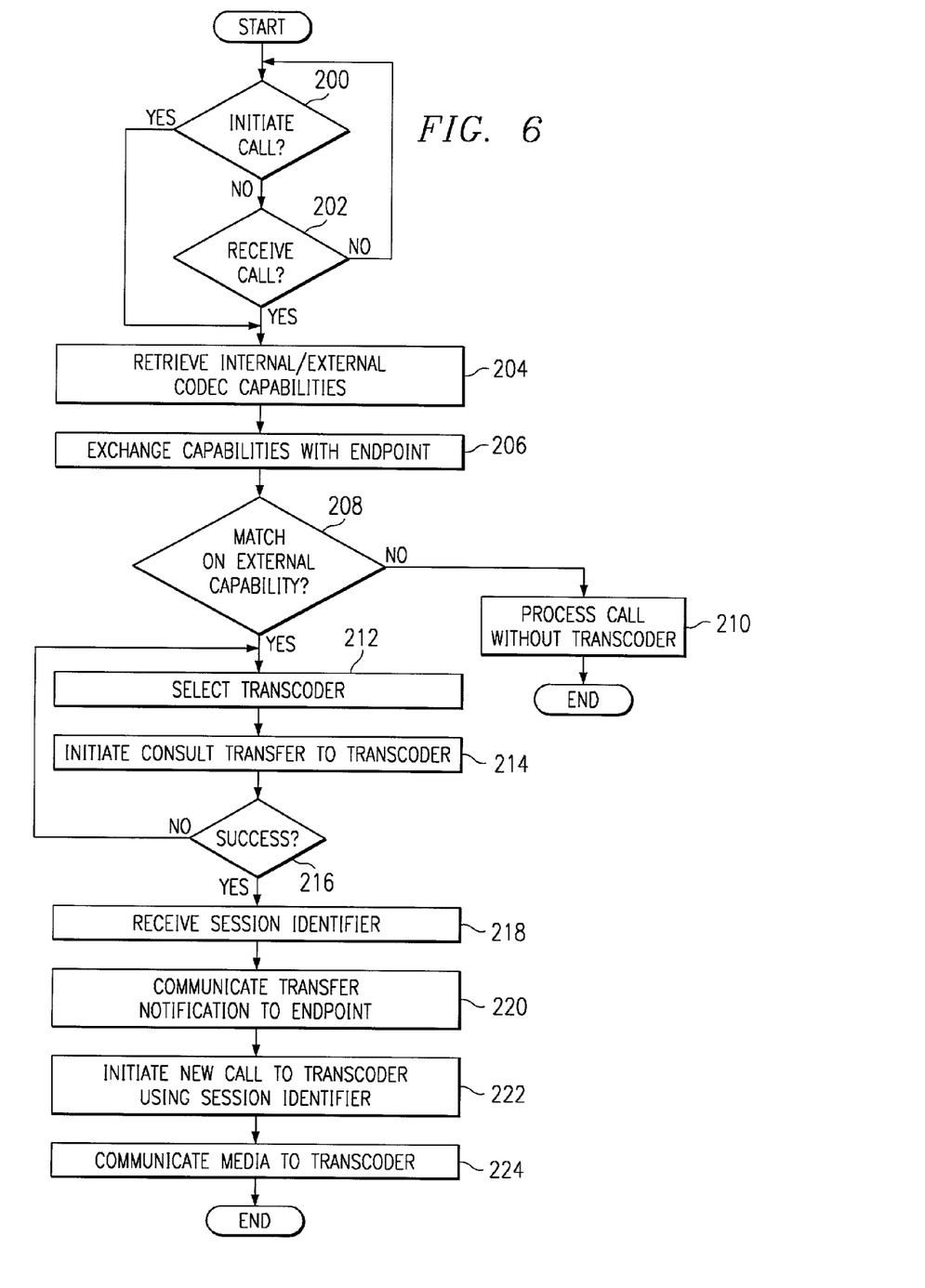
FIG. 6 is a flow chart of a method performed by a station to establish a communication system.

FIG. 6 is a flow chart of a method performed by station 12*a* to establish a communication session using protocol capabilities of transcoder 14. The method begins with station 12*a* determining whether a call has been initiated (step 200) or received (step 202). If either station 12*a* initiated a call or received a call, station 12*a* then retrieves both internal and external protocol capabilities from table 58 at step 204, and exchanges these capabilities with station 12*b* at step 206. If, upon exchanging capabilities, stations 12*a* and 12*b* do not need to rely on an external capability provided by transcoder 14, as determined at step 208, then station 12*a* proceeds to process the call without transcoder 14 at step 210.

If step 208 determines that an external protocol capability may be required, then station 12*a* selects an appropriate resource 72 in table 58 based on priority 76 and supported protocol capability 78 at step 212. Upon selecting transcoder 14 having the identified resource, station 12*a* initiates a consult transfer message to transcoder 14 at step 214. If the transfer is not successful as determined at step 216 because, for example, transcoder 14 does not have available resources to support the communication session, then station 12*a* selects another transcoder 14 at step 212.

If the transfer is successful as determined at step 216, then station 12*a* receives session identifier 90 from transcoder 14 at step 218. Station 12*a* communicates a transfer notification to station 12*b*, which includes both session identifier 90 and address 74 of the selected transcoder 14 at step 220. Station 12*a* then initiates a new call to transcoder 14 using session identifier 90 at step 222. Station 12*a* then communicates media to transcoder 14 at step 224.

Figure 7:
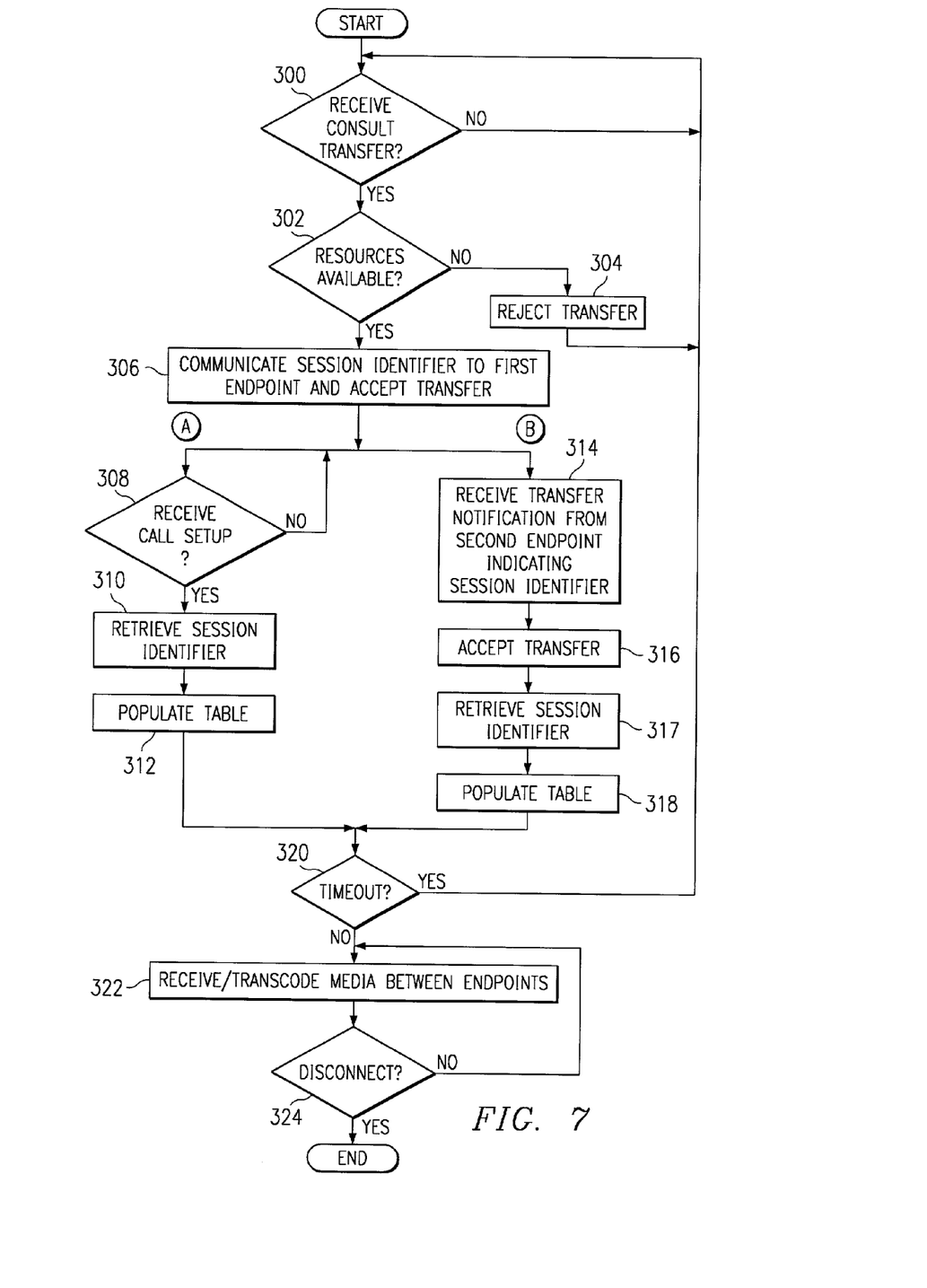
FIG. 7 is a flow chart of method performed by a transcoder to establish a communication session between stations.

FIG. 7 is a method performed by transcoder 14 to establish a communication session between stations 12*a* and 12*b*. Although this method focuses on a particular communication session involving two stations, system 10 contemplates transcoder 14 establishing a communication session with any number of stations 12. The method begins at step 300 where transcoder 14 receives a consult transfer from station 12*a*. If resources are not available to support the communication session as determined at step 302, then transcoder 14 rejects the transfer at step 304 and waits to receive another consult transfer at step 300. If resources are available as determined at step 302, then transcoder 14 communicates session identifier 90 to station 12*a* and accepts the transfer at step 306.

The method then proceeds down two paths indicating concurrent and/or sequential communications on side A with station 12*a* and communications on side B with station 12*b*.

For communications with station 12a, transcoder 14 determines whether it receives a call setup message at step 308 and, if so, retrieves session identifier 90 at step 310 and populates table 88 with an entry representing a communication link with station 12a at step 312. For communications with station 12b, transcoder 14 receives the transfer notification from station 12b at step 314, accepts the transfer at step 316, retrieves session identifier 90 at step 317, and populates table 88 with an entry reflecting a communication link between transcoder 14 and station 12b at step 318.

If transcoder 14 does not receive an entry representing a first link to station 12a and an entry representing a second link to station 12b within a predetermined amount of time, then transcoder 14 times out as determined at step 320 and restarts the process. This time out allows transcoder 14 to purge table 88 of orphaned single entries having session identifiers 90 that do not match any other entries in table 88. If a time out has not occurred at step 320, and transcoder 14 has received confirmation of link establishment to both stations 12a and 12b, then transcoder 14 proceeds to receive and transcode media between stations 12a and 12b at step 322. This continues until transcoder 14 receives a disconnect signal from either station 12a or 12b at step 324, and the method ends Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for establishing a call with a station using a transcoder, comprising:
   communicating protocol capabilities to the station in response to initiation of the call, wherein the protocol capabilities comprise the protocol capability of at least one remotely located transcoder;
   determining whether the protocol capability of the transcoder matches the protocol capability of the station;
   selecting the transcoder from a plurality of transcoders based on a priority;
   initiating a transfer of the call to the transcoder to establish a first link between the station and the transcoder; and
   initiating establishment of a second link with the transcoder to enable media exchange with the station using the protocol capability of the transcoder.

2. The method of claim 1, wherein communicating protocol capabilities is performed using a peer-to-peer signalling protocol.

3. The method of claim 1, wherein communicating protocol capabilities is performed using H.323 signalling protocol.

4. The method of claim 1, wherein initiating the transfer of the call comprises:
   initiating a consult transfer;
   receiving a session identifier from the transcoder; and
   communicating the session identifier to the station.

5. The method of claim 4, wherein initiating establishment of the second link with the transcoder comprises communicating to the transcoder a call setup request having the session identifier.

6. The method of claim 1, wherein media comprises voice information and the protocol capability of the transcoder comprises a voice compression protocol.

7. A communication device, comprising:
   an interface operable to communicate with a network;
   a memory operable to store protocol capabilities in a plurality of entries, each entry corresponding to a remotely located transcoder and specifying an address of the transcoder and at least one protocol capability of the transcoder; and
   a processor coupled to the interface and the memory, the processor operable, in response to initiation of a call, to generate a first signal to communicate the protocol capabilities to a station, the protocol capabilities comprising the protocol capability of at least one remotely located transcoder, the processor further operable to generate a second signal to initiate transfer of the call to a selected transcoder, the processor further operable to generate a third signal to initiate communication with the selected transcoder to enable media exchange with the station using the selected transcoder.

8. The communication device of claim 7, wherein the first signal, the second signal, and the third signal comply with H.323 signalling protocol.

9. The communication device of claim 7, wherein the second signal comprises a consult transfer to the transcoder that produces a session identifier.

10. The communication device of claim 9, wherein the third signal comprises a call setup request having the session identifier.

11. The communication device of claim 7, wherein media comprises voice information and the protocol capability of the transcoder comprises a voice compression protocol.

12. A method for establishing a communication session between a first station and a second station, the method comprising:
   establishing a session identifier associated with the communication session responsive to a protocol capabilities communication between the first station and the second station;
   receiving a determination whether the protocol capability of a transcoder matches the protocol capabilities of the first station and the second station;
   receiving a selection of the transcoder from a plurality of transcoders based on a priority;
   establishing a first link between the first station and the transcoder using the session identifier;
   establishing a second link between the second station and the transcoder using the session identifier; and
   exchanging media between the first station and the second station using the first link and the second link.

13. The method of claim 12, wherein establishing the session identifier associated with the communication session comprises:
   receiving a consult transfer from the first station; and
   communicating the session identifier associated with the consult transfer to the first station.

14. The method of claim 12, wherein establishing the first link comprises receiving a call setup request having the session identifier.

15. The method of claim 12, wherein establishing the second link comprises receiving a transfer notification having the session identifier.

16. The method of claim 12, wherein exchanging media comprises:
   associating the first link and the second link using the session identifier;
   transcoding first information received from the first link for communication to the second link; and
   transcoding second information received from the second link for communication to the first link.

17. The method of claim 12, wherein the steps of establishing the first link and establishing the second link are performed using peer-to-peer signalling protocols.

18. The method of claim 12, wherein the steps of establishing the first link and establishing the second link are performed using H.323 signalling protocols.

19. Logic encoded in media for establishing a call with a station using a transcoder, the logic operable to perform the following steps:
communicating protocol capabilities to the station in response to initiation of the call, wherein the protocol capabilities comprise a protocol capability of at least one remotely located transcoder;
determining whether the protocol capability of the transcoder matches a protocol capability of the station;
selecting the transcoder from a plurality of transcoders based on a priority;
initiating a transfer of the call to the transcoder to establish a first link between the station and the transcoder; and
initiating establishment of a second link with the transcoder to enable media exchange with the station using the protocol capability of the transcoder.

20. The logic of claim 19, wherein communicating protocol capabilities is performed using a peer-to-peer signalling protocol.

21. The logic of claim 19, wherein communicating protocol capabilities is performed using H.323 signalling protocol.

22. The logic of claim 19, wherein initiating the transfer of the call comprises:
initiating a consult transfer;
receiving a session identifier from the transcoder; and
communicating the session identifier to the station.

23. The logic of claim 22, wherein initiating establishment of the second link with the transcoder comprises communicating to the transcoder a call setup request having the session identifier.

24. The logic of claim 19, wherein media comprises voice information and the protocol capability of the transcoder comprises a voice compression protocol.

25. An apparatus for establishing a call with a station using a transcoder, comprising:
means for communicating protocol capabilities to a station in response to initiation of the call, wherein the protocol capabilities comprise the protocol capability of at least one remotely located transcoder;
means for determining whether the protocol capability of the transcoder matches a protocol capability of the station;
means for selecting the transcoder from a plurality of transcoders based on a priority;
means for initiating a transfer of the call to the transcoder to establish a first link between the station and the transcoder; and
means for initiating establishment of a second link with the transcoder to enable media exchange with the station using the protocol capability of the transcoder.

26. The apparatus of claim 25, wherein means for communicating protocol capabilities is performed using a peer-to-peer signalling protocol.

27. The apparatus of claim 25, wherein means for initiating the transfer of the call comprises:
means for initiating a consult transfer;
means for receiving a session identifier from the transcoder; and
means for communicating the session identifier to the station.

28. The apparatus of claim 25, wherein media comprises voice information and the protocol capability of the transcoder comprises a voice compression protocol.

29. A method for establishing a call with a station using a transcoder, comprising:
storing protocol capabilities in a plurality of entries in a memory, each entry corresponding to a remotely located transcoder and specifying an address of the transcoder and at least one protocol capability of the transcoder;
communicating protocol capabilities to the station in response to initiation of the call, the protocol capabilities comprising the protocol capability of at least one remotely located transcoder;
initiating a transfer of the call to a selected transcoder to establish a first link between the station and the selected transcoder; and
initiating establishment of a second link with the selected transcoder to enable media exchange with the station using the selected transcoder.

30. A method for establishing a call with a station using a transcoder, comprising:
communicating protocol capabilities to the station in response to initiation of the call, wherein the protocol capabilities comprise the protocol capability of at least one remotely located transcoder;
selecting the transcoder from a plurality of transcoders if the protocol capability of the transcoder matches the protocol capability of the station;
initiating a transfer of the call to the transcoder to establish a first link between the station and the transcoder; and
initiating establishment of a second link with the transcoder to enable media exchange with the station using the transcoder.

31. The communication device of claim 7, wherein the first signal, the second signal, and the third signal comprise peer-to-peer signalling protocol.

32. The communication device of claim 31, wherein each entry in the memory further comprises a priority for selection of the corresponding transcoder.

33. Logic encoded in media for establishing a call with a station using a transcoder, the logic operable to perform the following steps:
storing protocol capabilities in a plurality of entries in a memory, each entry corresponding to a remotely located transcoder and specifying an address of the transcoder and at least one protocol capability of the transcoder;
communicating protocol capabilities to the station in response to initiation of the call, the protocol capabilities comprising the protocol capability of at least one remotely located transcoder;
initiating a transfer of the call to a selected transcoder to establish a first link between the station and the selected transcoder; and
initiating establishment of a second link with the selected transcoder to enable media exchange with the station using the selected transcoder.

34. Logic encoded in media for establishing a call with a station using a transcoder, the logic operable to perform the following steps:
communicating protocol capabilities to the station in response to initiation of the call, wherein the protocol capabilities comprise the protocol capability of at least one remotely located transcoder;
selecting the transcoder from a plurality of transcoders if the protocol capability of the transcoder matches the protocol capability of the station;
initiating a transfer of the call to the transcoder to establish a first link between the station and the transcoder; and initiating establishment of a second link with the transcoder to enable media exchange with the station using the transcoder.

35. An apparatus for establishing a call with a station using a transcoder, comprising:
- means for storing protocol capabilities in a plurality of entries in a memory, each entry corresponding to a remotely located transcoder and specifying an address of the transcoder and at least one protocol capability of the transcoder;
- means for communicating protocol capabilities to the station in response to initiation of the call, the protocol capabilities comprising the protocol capability of at least one remotely located transcoder;
- means for initiating a transfer of the call to a selected transcoder to establish a first link between the station and the selected transcoder; and
- means for initiating establishment of a second link with the selected transcoder to enable media exchange with the station using the selected transcoder.

\* \* \* \* \*